UNITED STATES PATENT OFFICE.

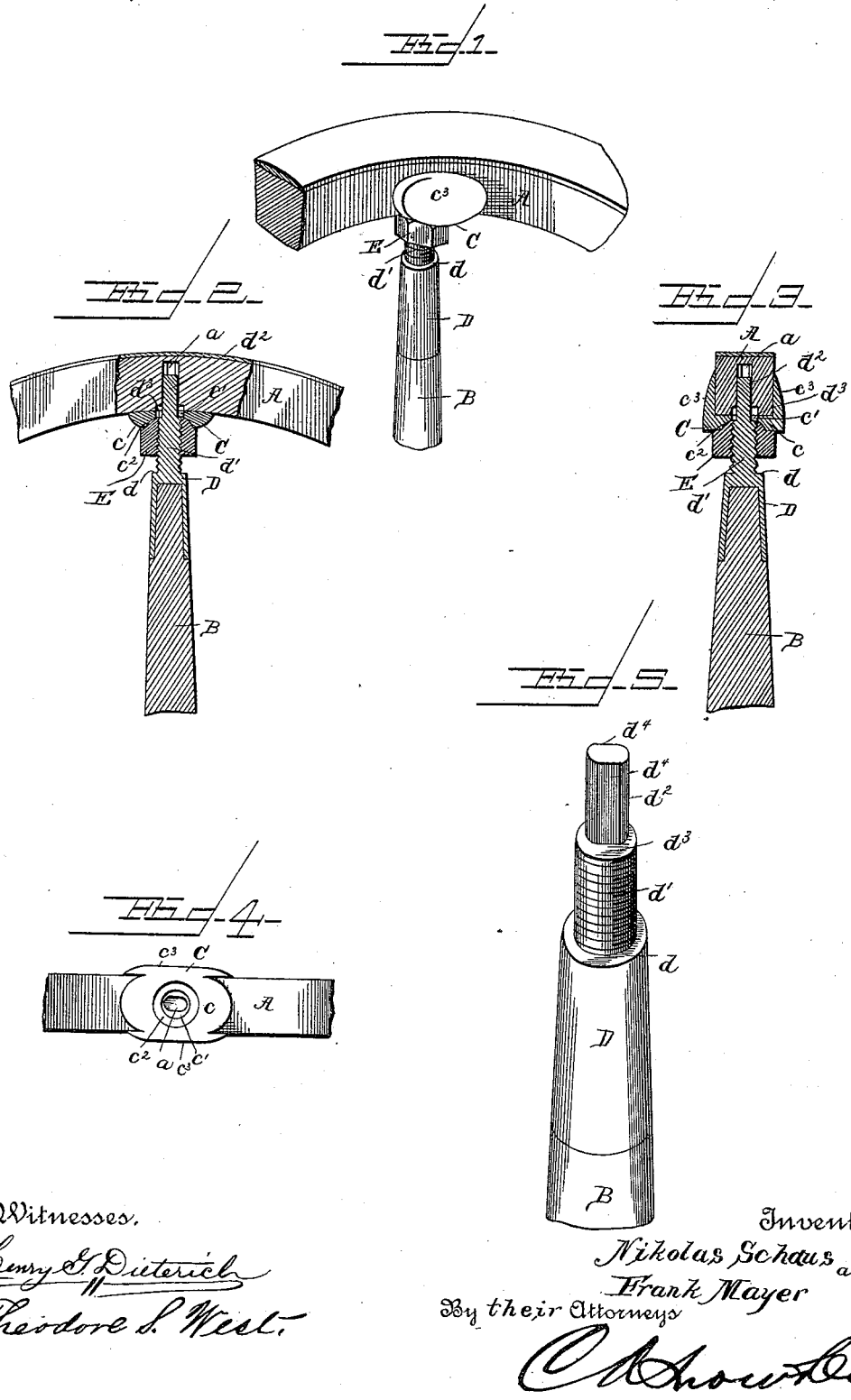

NIKOLAS SCHAUS AND FRANK MAYER, OF COLLINS, NEW YORK.

VEHICLE-WHEEL.

SPECIFICATION forming part of Letters Patent No. 396,514, dated January 22, 1889.

Application filed March 29, 1888. Serial No. 268,808. (No model.)

*To all whom it may concern:*

Be it known that we, NIKOLAS SCHAUS and FRANK MAYER, citizens of the United States, residing at Collins, in the county of Erie and State of New York, have invented a new and useful Improvement in Vehicle-Wheels, of which the following is a specification.

The invention relates to improvements in vehicle-wheels, pertaining more especially to the construction of the parts forming the joints between the fellies and spokes; and it consists in the construction and novel combination of parts hereinafter described, and pointed out in the appended claims.

In the drawings, Figure 1 is a perspective view of a part of a wheel embodying the invention. Fig. 2 is a longitudinal section through a felly and connected spoke. Fig. 3 is a transverse section of the same. Fig. 4 is a plan view of the socket opening or recess in the felly. Fig. 5 is a perspective view of the end of the spoke detached.

A designates a felly, and B a spoke of a wheel. The felly has a spoke mortise or recess, $a$, flat laterally to the felly, but rounded longitudinally thereto, the said recess being extended or elongated longitudinally.

C is a metal clip, the base-plate $c$ of which lies against the inner surface of the felly and has a circular opening, $c'$, that registers with the recess $a$ in the felly. This opening $c'$ has a circumferential seat, $c^2$, concave in cross-section and adapted to receive the end of a nut, hereinafter described.

$c^3$ $c^3$ are side plates or wings rising from the edges of the base-plate $c$ and closely embracing the sides of the felly. The said wings are secured sufficiently tight to the felly to hold the clip concentric with the corresponding spoke-recess. The spoke B has its inner end squared and tapered, in the usual manner, to enter the corresponding recess in the hub, and on its outer end is fitted a metal cap, D, that cannot turn on the spoke. The said cap has a circumferential shoulder, $d$, outward from which is the tapped stem $d'$, at the end of which is the socket-pin $d^2$, separated from the tapped stem by the circumferential shoulder $d^3$. The socket-pin $d^2$ fits into the socket-recess $a$, having its sides $d^4$ made flat to correspond with the flat sides of said recess, so that the pin cannot turn in the recess, but can move in and out therein. E is a nut that engages the tapped stem $d'$ and has on its outer end the circumferential shoulder, $e$, that fits into the seat $c^2$ and can turn therein. The tapped stem $d'$ is sufficiently longer than the nut is wide to permit the latter to move inward and outward thereon. The inner squared end of the spoke cannot turn in the hub, the cap D cannot turn on the outer end of the spoke, and the socket-pin cannot turn in the square-sided recess in the felly. Then as the fellies are bound together by the tire, should they become loose and the spokes diminish or render unsteady the dish of the wheel, the nuts E can be screwed outward, driving the fellies outward, so that the rim will be tightened and the dish retained firm and at its proper angle.

The squared socket-pin, the correspondingly-squared recess or socket in the felly, and the non-rotatory cap on the end of the spoke prevent the turning of the nut from moving the felly out of alignment with those adjacent to it, so that by the simple means described the wheel can be easily and quickly expanded and tightened.

By means of the invention a wheel may be loosened up in wet weather when the spokes and fellies swell, a broken spoke may be removed without removing the tire, and too much dishing of the wheel may be remedied.

Having described our invention, we claim—

1. In a wheel, the combination of the felly having a spoke-socket flattened laterally to the felly, the spoke, a non-rotatable cap secured to the outer end of the spoke and provided with a socket-pin corresponding in cross-section to that of said socket, a threaded portion between said pin and the spoke, and a nut engaging said threaded portion and bearing against a clip or washer seated on the inner edge of the felly, whereby the latter may be moved outward from the hub, substantially as specified.

2. In a wheel, the combination, with a felly provided with the spoke-socket $a$, flattened laterally to the felly, and the clip C, provided with the opening $c'$ and surrounding shoulder $c^2$, and having lateral wings, by means of which it may be shrunk in position on the felly, of a spoke, the non-rotatable cap D thereon, which cap is provided with the socket-pin $d^2$, flattened on its sides and fitting in the socket, and with the threaded portion $d'$, and the nut E, engaging on said threaded portion and fitting against the seat $c^2$ of the clip, substantially as specified.

In testimony that we claim the foregoing as our own we have hereto affixed our signatures in presence of two witnesses.

NIKOLAS SCHAUS.
FRANK MAYER.

Witnesses:
JOHN N. SCHMITT,
JOSEPH NABER, Jr.